(12) United States Patent
Anderson

(10) Patent No.: US 7,547,854 B1
(45) Date of Patent: Jun. 16, 2009

(54) BOUNDARY FOR SWITCH APPARATUS

(75) Inventor: Ladd Anderson, Salt Lake City, UT (US)

(73) Assignee: Cobalt Flux, Salt Lake City, UT (US)

( * ) Notice: Subject to any disclaimer, the term of this patent is extended or adjusted under 35 U.S.C. 154(b) by 0 days.

(21) Appl. No.: 11/515,297

(22) Filed: Sep. 1, 2006

Related U.S. Application Data

(63) Continuation of application No. 10/879,439, filed on Jun. 29, 2004, now Pat. No. 7,122,751.

(60) Provisional application No. 60/536,896, filed on Jan. 16, 2004.

(51) Int. Cl.
*H01H 35/36* (2006.01)
*H01H 3/14* (2006.01)

(52) U.S. Cl. ............... 200/85 R; 200/345; 200/520; 482/51; 482/57; 434/55; 434/37

(58) Field of Classification Search ............ 200/85 R, 200/341–345, 520–521, 294–295; 482/1, 482/3, 51, 57, 118; 434/29, 37, 55, 58
See application file for complete search history.

(56) References Cited

U.S. PATENT DOCUMENTS

| | | | | |
|---|---|---|---|---|
| 4,386,776 A | * | 6/1983 | Bromley | 463/4 |
| 4,720,789 A | * | 1/1988 | Hector et al. | 463/33 |
| 5,322,489 A | * | 6/1994 | Webb et al. | 482/38 |
| 5,510,586 A | * | 4/1996 | Hacking | 200/86 R |
| 5,822,690 A | * | 10/1998 | Rynk et al. | 455/351 |
| 5,997,304 A | * | 12/1999 | Wood | 434/169 |
| 6,028,278 A | * | 2/2000 | Fluman | 200/512 |
| 6,054,658 A | * | 4/2000 | Duhon et al. | 200/86 R |
| 6,106,439 A | * | 8/2000 | Boland | 482/51 |
| 6,450,886 B1 | * | 9/2002 | Oishi et al. | 463/36 |
| 6,589,989 B1 | * | 7/2003 | Bollag et al. | 514/559 |
| 6,761,563 B1 | * | 7/2004 | Lin | 434/169 |
| 6,765,165 B1 | * | 7/2004 | Torrens | 200/512 |
| 7,176,397 B2 | * | 2/2007 | Grzan | 200/85 R |
| 2004/0045149 A1 | * | 3/2004 | Dolinski | 29/428 |
| 2004/0127285 A1 | * | 7/2004 | Kavana | 463/36 |

OTHER PUBLICATIONS

4 Pages From Website: http://www.geofitness.com.
Review From PSM, Issue 78, Dec. 2003, vol. 7.
Review From Wired, Dec. 2003.
Information Disclosure Statement Under 37 CFR § 1.98—4 pgs.

* cited by examiner

*Primary Examiner*—Kyung Lee
(74) *Attorney, Agent, or Firm*—Brian C. Trask

(57) ABSTRACT

A platform of the type holding a plurality of normally-open electric switches in position for activation of a selected individual switch by application of a force in a direction normal to a surface of the switch by a portion of a human body. An exemplary platform according to the invention forms a dance platform on which a user steps to activate switches in accordance with instructions viewed on a video display device. A joining structure may by used to hold two platforms in a side-by-side competition arrangement. A security vault may be affixed to structure associated with platform to resist theft of a commercially available game controller adapted to operate the video display and to receive switch input from a platform. Certain aspects of the invention include one or more, typically inert, practice platforms structured to represent the user interface surface of an activatable platform. A method for using a system of active and inert platforms is also disclosed.

20 Claims, 8 Drawing Sheets

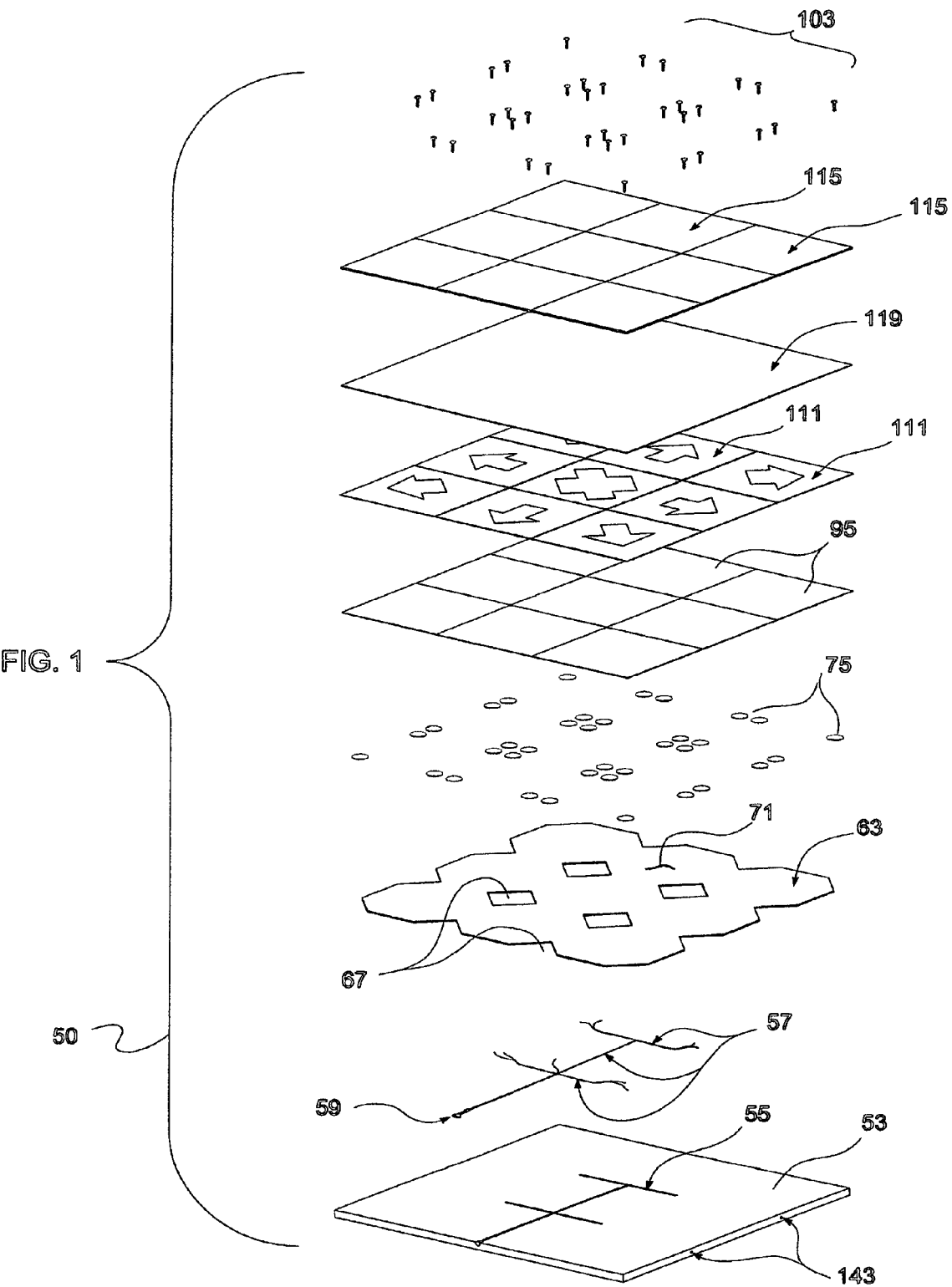

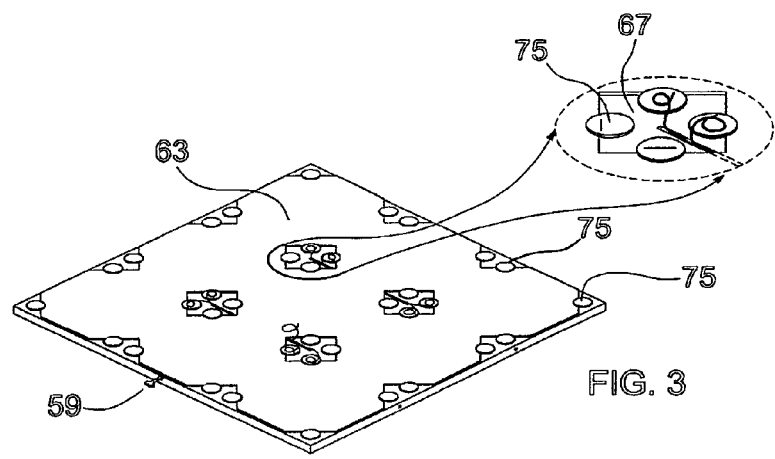
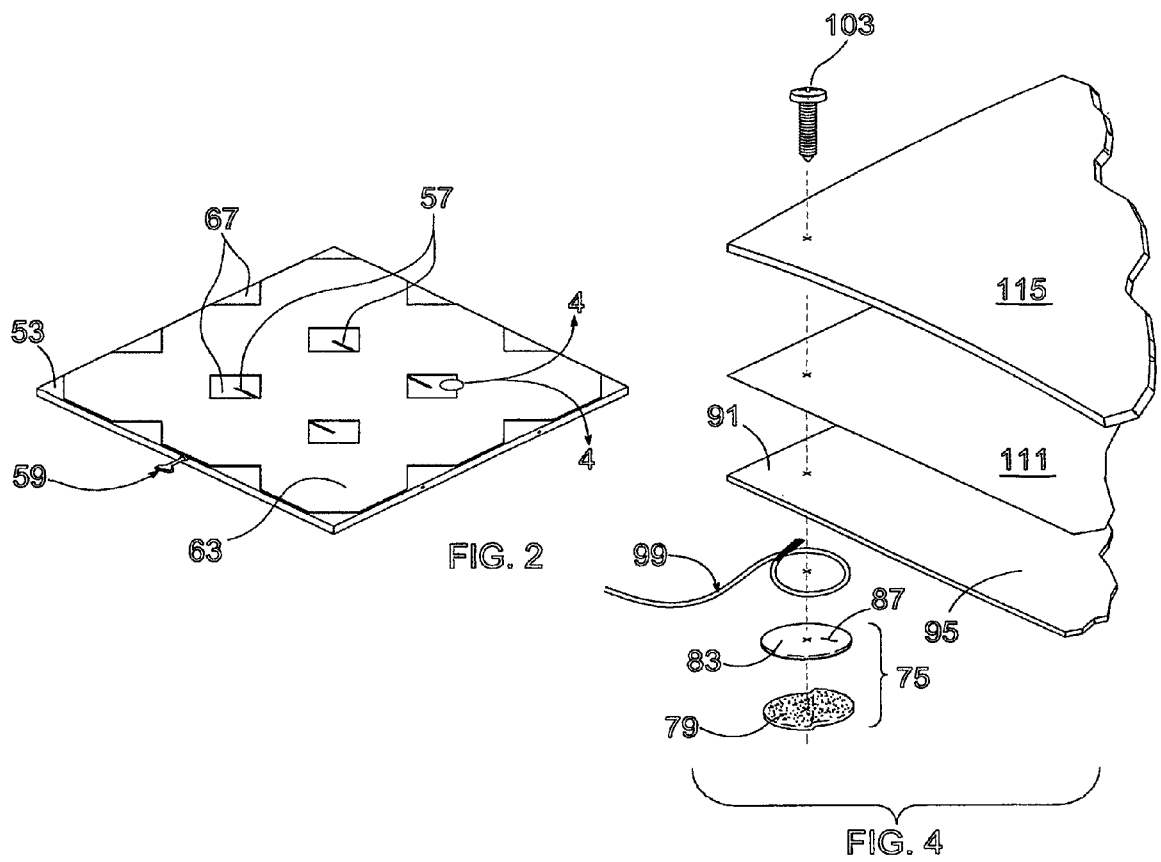

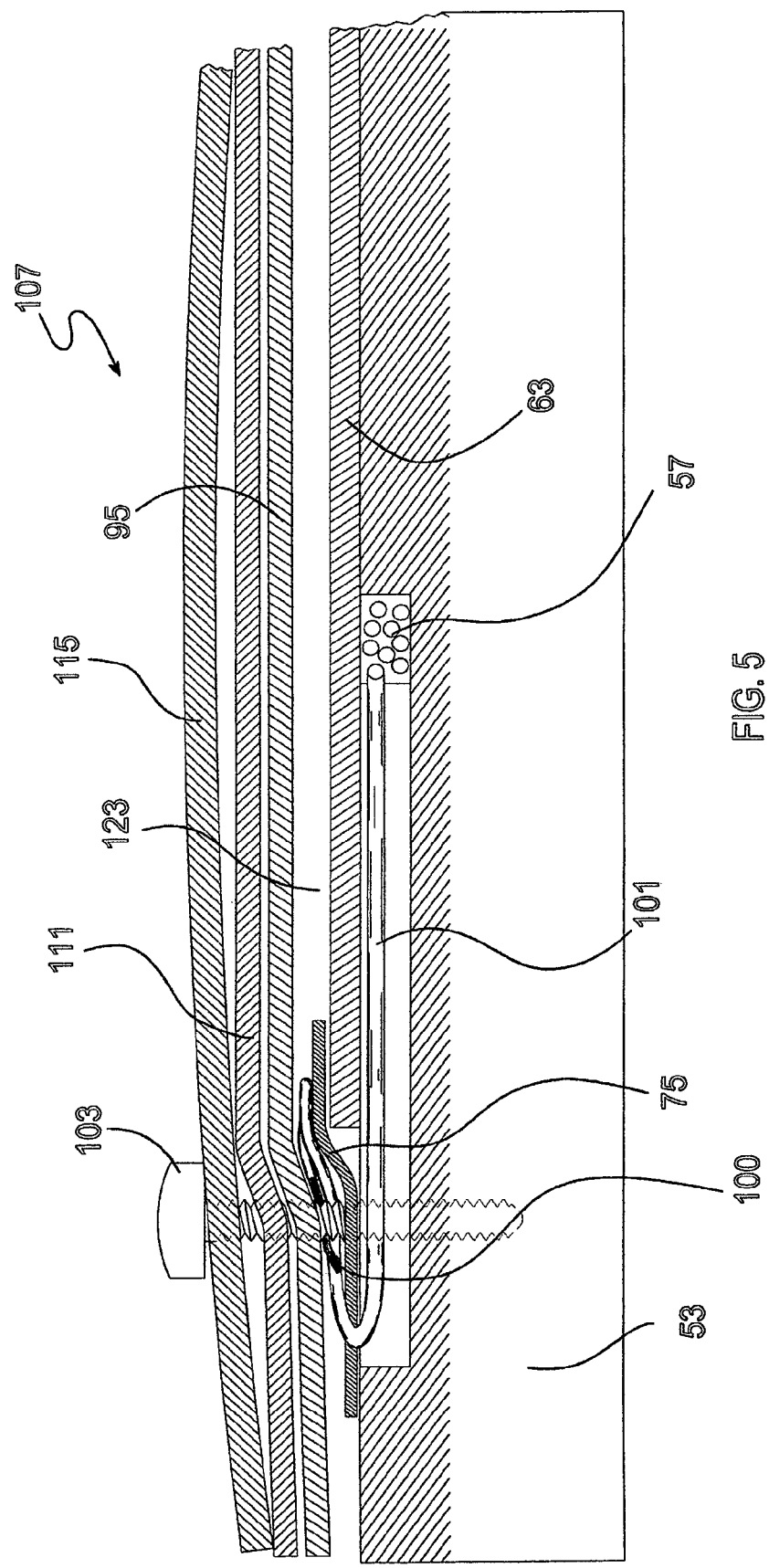

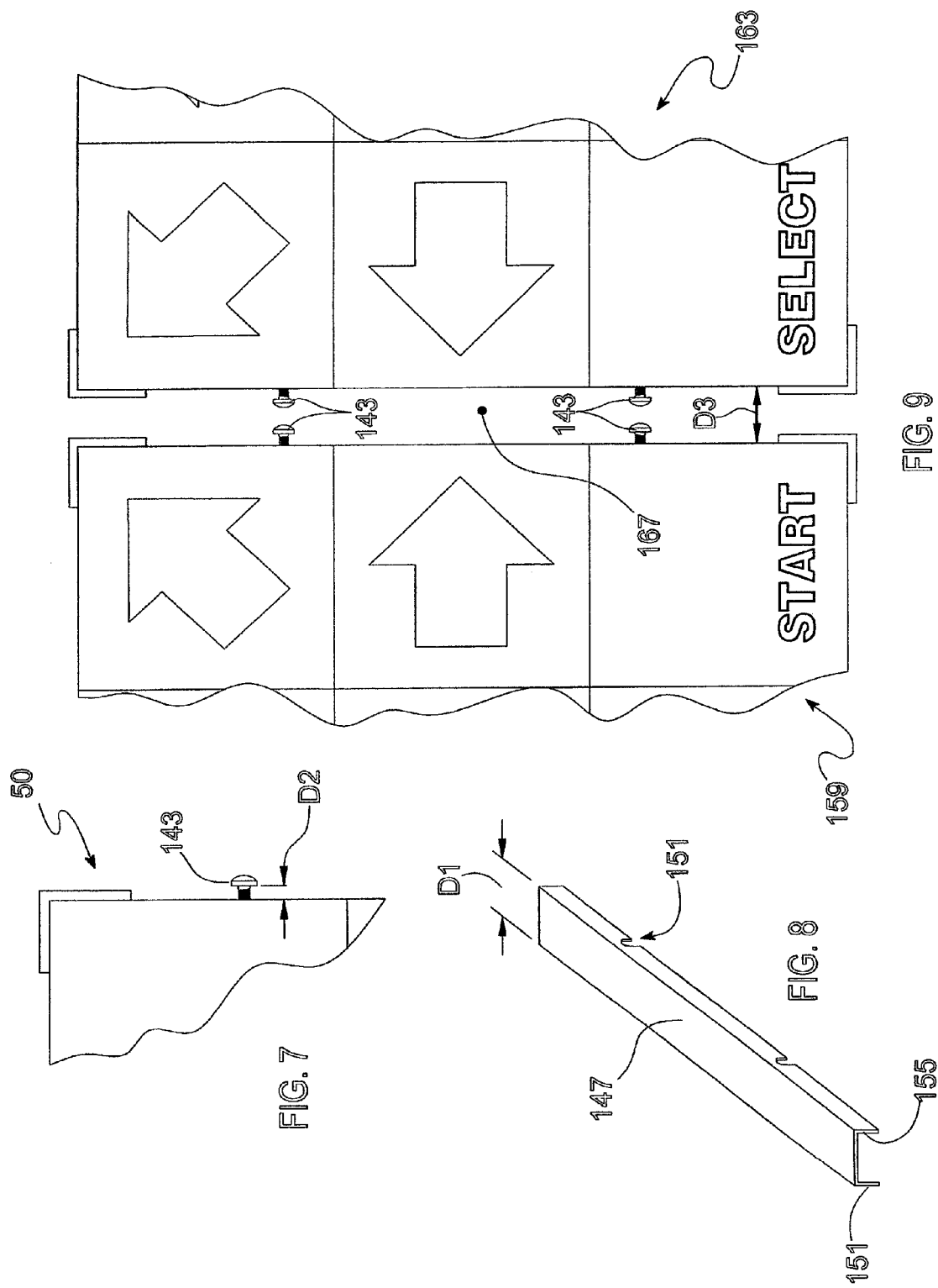

BOUNDARY FOR SWITCH APPARATUS

RELATED APPLICATIONS

This application is a divisional from U.S. application Ser. No. 10/879,439, filed Jun. 29, 2004 now U.S. Pat. No. 7,122,751, titled "SWITCH APPARATUS", which claims the benefit under 35 U.S.C. 119(e) of the filing date of Provisional Application Ser. No. 60/536,896 filed Jan. 16, 2004, titled "DANCE PLATFORM".

BACKGROUND OF THE INVENTION

1. Field of the Invention

This invention relates to platforms operable to hold normally-open or normally closed switches in a fixed orientation in an electric circuit for activation of a selected switch by application of a force onto the switch by a portion of a human body.

2. State of the Art

Platforms of the type holding normally-open switches in a fixed arrangement for activation of a selected switch by placements of a user's foot are disclosed in U.S. Pat. Nos. 6,227,968 and 6,410,835 to Suzuki et al. Such platforms are used commercially in a competitive game format, and may be characterized as dance platforms. A dance platform includes nine tiles that are approximately 11 inches square; arranged in three rows of three tiles each, in a tic-tac-toe type pattern. Each tile represents a place for a user, or platform operator, to stand. Indicia, such as arrows, are displayed on certain tiles. The operator of such a dance platform tries to stand on indicia in accordance with instructions visible on an associated video display. The video display is mounted for viewing by the platform operator. In a competitive arrangement, a pair of dance platforms are disposed in side-by-side harmony so that a pair of users can see the video display at the same time. An output caused by switch activation is provided from each platform as feedback to a controller operable to evaluate a user's performance.

In one commercial arrangement providing competitive dance platforms operable as a game, the platforms are disposed in association with a video display and controller substantially as a single unitary structure in an arcade setting. Such an arrangement provides a measure of theft resistance to individual components of the system, but consequently reduces portability of the system.

Software has been commercially developed for use with commercially available game consoles or controllers, such as the Sony PlayStation II and Microsoft Xbox, for individual use in a home environment. Portable dance platforms configured to interface with such game controllers to replicate an arcade gaming experience are commercially available from several sources. It is believed that a manufacturing Company located in China is distributing dance platforms through a plurality of business names, including My-My Box; Red Octane; and Buynshop.

Commercially available dance platforms include types that may be either rigid or roll-up. Rigid platforms may be characterized as including structure operable to maintain their planar shape, and to hold their switches in a fixed relative orientation. Typically, switch elements of such platforms are mounted on a substrate made from wood. Rigid platforms tend to be heavier, which reduces ease of transportability. Switches of certain rigid platforms include a plexiglass plastic tile, which carries a sheet of electrically conductive foil, suspended over a copper coil element. The tile is suspended about its perimeter by a rim of open cell foam adapted to bias the tile (and its conductive foil) apart from the copper coil. When a user steps on the tile, the foil is displaced into bridging contact across positive and negative terminals of the copper coil element. Unfortunately, the foil often flakes off, leaving a bridge on the copper coil, and results in a "stuck button". The plexiglass plastic tiles also tend to break under extended use of the platform. Furthermore, the open cell foam wears out over time, resulting in a "stuck button" or a button that can misfire or send a false signal.

Platforms of the roll-up type tend to be light in weight, and by rolling up, can easily be transported and stored in a reduced-size volume. Companies selling roll-up type platforms include: Naki International, having a place of business at 5101 Commerce Drive, Baldwin Park, Calif. 91706; Mad Cats, having a place of business at 7480 Mission Valley Road, Suite 101, San Diego, Calif. 92018; and Pelican, having a place of business at 181840 East 27th Street, Vernon, Calif. 90058.

Roll-up platforms typically include a pair of electrically conductive film elements spaced apart by a thin (perhaps ¼ inch) layer of perforated open cell foam. Such platforms tend to be more delicate, and typically are operated without shoes on a user's feet. When a user steps on a switch portion of such a platform, the conductive elements make contact at perforation locations under the user's foot. Unfortunately, the open cell foam wears out under repeated use, causing false signals. The conductive film elements also wear out, flake apart, and can cause misfire signals. Certain competitive moves cannot be performed on a roll-up platform, because the platform cannot maintain a planar shape under certain user movements. In fact, operating a roll-up platform at an advanced level of play can cause the foam and switch elements to migrate or move with respect to an opaque covering. Consequently, a user stepping on a valid switch location may inadvertently cause a signal from a neighbor switch that has migrated.

It is important to a user of a platform for that platform to be accurate, so that no false signals are sent to a controller. Switches in a platform desirably are responsive to a user's contact, fast acting, and reliably and repeatably activated by a user properly engaging a switch portion of the platform. Preferred dance platforms provide a "feel" to a user in harmony with the "feel" of an arcade game sold in the United States by the Konami Arcade Division since 2001 and known by the name "Dance Dance Revolution" or DDR.

It would be an improvement in the art to provide a switch carrying platform operable in various physical therapies. A further advance would provide a portable platform having a responsive "feel" and reliable normally-open switch action. An additional advance would provide a dance platform causing a reduced repetitive stress impact on a user. A further advance would provide structure to resist injury to a user arising from the user stepping onto an edge portion of the platform. Another advance would provide structure to couple a pair of platforms in a side-by-side arrangement for competitive operation of the pair of platforms while operators of the platforms make reference to a single video display. A still further advance would provide a reduced-cost practice platform. Yet another advance would provide a system for obtaining exercise in a group setting. A still further advance would provide a platform and a theft resistant arrangement for an associated controller.

BRIEF SUMMARY OF THE INVENTION

The present invention provides an apparatus and method to provide an instruction set to a user, and to measure a response of that user to the instruction set. The invention can be embodied in a platform of the type holding a plurality of normally-open electrically conductive switches. It is within contemplation to provide alternative platforms with similar construction, but having normally-closed switches.

In general, certain currently preferred embodiments of a platform are configured and arranged to permit closing of an individual selected switch by application of a force in a direction approximately normal to an activation surface of the selected switch by a portion of a human body. In one preferred configuration, a platform is structured for disposition in a substantially horizontal orientation to permit closing of individual of said switches by a foot of a user. Such a horizontal platform sometimes is characterized as a dance platform. An alternative platform is structured for disposition in a substantially vertical orientation to permit closing of individual of said switches by a hand of a user. However, platforms may be arranged at any convenient angular orientation.

A platform may include an electrically conductive ground member disposed to provide a common electrical ground reference for a plurality of switches. A switch typically includes an electrically conductive deflection member carrying a conductive area disposed in a substantially parallel arrangement relative to a portion of the ground member. The deflection member is placed in a normally spaced apart relationship adapted to resist forming an electrically conductive contact between the ground member and the conductive area, by a fastening arrangement disposed at a perimeter of the deflection member operably to cause a membrane-bias in the deflection member effective to establish the normally spaced apart relationship. The deflection member is structured to permit deflection of a portion of itself in a direction effective to form the electrical contact under application of a switch activation, or closing, force.

A dance platform typically includes nine zones arranged in three adjacent rows of three zones per row, each individual zone comprising an activation surface disposed individually to receive foot contact from a user, and the plurality of switches are disposed to locate one switch at each of a selected number of the zones.

An operable deflection member includes an approximately square planar element having four corners and carries a conductive area disposed on a membrane surface spanning between the corners. An operable ground member includes a planar element having a plurality of perforations disposed in harmony with at least the four corners of one deflection member when the deflection member is in an assembled configuration, with a perforation being located at each corner of the one deflection member and sized to permit placement of a fastener operably therethrough to secure the one deflection member in functional relation with respect to the ground member.

In some embodiments of a platform, a fastener is placed in penetrating engagement through a corner of a deflection member. In other embodiments within contemplation, a fastener may be placed through bracket structure operably to hold a plurality of deflection members. Certain perforations in a ground element include edge structure operable as a fulcrum in harmony with an installed fastener to cause the membrane bias in a deflection member. A currently preferred fulcrum structure includes a corner button operable in combination with an installed fastener to cause a membrane bias in a deflection member.

It currently is preferred for a dance platform to carry a wire harness including nine electrically conductive wires. The wire harness can be disposed in a branched channel carried by a base member. At least one wire of the nine wires will generally have an exposed conductive portion arranged for compression contact on a conductive area of a deflection member. Desirably, the compression contact is caused by installation of a fastener.

To improve reliability in certain environments, a contaminant resistant membrane may be disposed substantially to cover the plurality of switches effective to resist passage of particulate matter to a normally spaced-apart area between a deflection member and a ground member.

Sometimes, it is desirable to include a resilient element disposed in a load bearing path between a switch activation surface and a support for a platform. An operable resilient element can deflect responsive to a foot strike on an activation surface effectively to reduce repetitive contact stress on a user.

In some cases, a platform may be used in combination with a tub adapted to receive a bottom of the platform and configured to provide a load-bearing ramp edge disposed about a perimeter of the platform to accommodate a difference in elevation between a top surface of the platform and a platform support surface. Such a ramp is operable to resist twisting an ankle of a user who steps on the perimeter. Desirably, the tub further includes a friction enhancing interface disposed operably to resist movement of the platform relative to a platform support surface. Sometimes the tub is adapted to dispose a resilient element for contact with a bottom of the platform and also to provide a ramp edge disposed about a perimeter of the platform as a load-bearing transition between a top surface of the platform and a tub support surface.

To promote competition between a pair of users, a second platform may be disposed side-by-side with a first platform. Typically, coupling structure is provided and adapted for connection to both of the first platform and the second platform to maintain a substantially fixed and side-by-side orientation. One operable embodiment of coupling structure includes spacing structure configured and arranged to maintain a substantially fixed distance between two platforms. Desirably, the coupling structure is removable from coupling engagement between the first and second platforms in a tool-free operation.

As a theft-reducing measure, dance platforms may used in combination with a security vault sized substantially to contain therein a commercially available game console, or controller, and providing one or more access ports through which to place the game console in electrical communication with a platform and a video display device. Typically, the vault is disposed in tethered engagement to structure associated with the platform.

Typically, an active dance platform according to the invention is used in combination with a controller such as a commercially available game controller. Such a controller includes a processor having an associated memory. The processor is adapted to receive an input from the plurality of switches of the platform. A software instruction set is loaded into the memory and configured to compare the platform input with a defined sequence of switch operation, and to display feedback for a user of the platform on a video display device.

A platform having operable switches to produce a signal corresponding to user input may be regarded as an active platform. A user of an active platform may be regarded as a prime, or active, user. A practice platform may be defined as having structure, or elements, arranged substantially to suggest portions of an operable activation surface of an active platform, but generally is not connected to a controller to provide user input to that controller. A user of a practice platform may be regarded as a practice user. One or more practice platform can be disposed on a support surface in harmony with a first active platform such that a practicing user, while operating a practice platform, may receive an input from a video display device used by the prime user.

A practice platform may include a rectangular display surface structured to indicate a plurality of discrete zones, each zone corresponding to a switch activation area of an active platform. Broadly, a rectangular area includes a square area. One desirable practice platform includes a first walkway and a second walkway, each walkway carrying a plurality of zones and being structured cooperatively to form an interlocking arrangement in the shape of a cross for disposition of the cross on a load bearing support surface. An other operable practice platform includes a plurality of discrete emblems disposable in a desired pattern maintained by a friction interface between a bottom of each of the emblems and a load bearing support surface, each of the emblems corresponding to a switch activation area of an active platform.

The invention can be embodied as a standalone practice platform, adapted for use independent of connection to an electronic device. Such practice platform being structured to be visually representative of an activation surface of a dance platform of the type including a plurality of switches disposed for individual activation by foot placements of a user stepping upon a selected portion of the activation surface of the dance platform. In such an embodiment, an activation surface may include an approximately square surface carrying indicia defining a plurality of zones individually adapted to be visually representative of a selected portion. In an alternative arrangement, an activation surface may be embodied as a cross formed by two interconnectable sidewalks, each sidewalk carrying indicia defining a plurality of zones individually adapted to be visually representative of a selected portion. A second alternative arrangement forming a practice activation surface includes a plurality of emblems adapted to be disposed in an arrangement on a load bearing surface and thereby adapted to be visually representative of a selected portion.

A method of use of a system of dance and practice platforms typically includes providing a first electrically active dance platform having a plurality of switches disposed for individual switch activation by foot placements of a user stepping upon a selected portion of the platform, the first platform being in electrical communication with a control device having a processor with an associated memory. The processor is generally adapted to receive an input from the plurality of switches of the first platform and includes a software instruction set loaded into the memory and configured to compare the received input with a defined sequence of switch operation, and to display feedback for a prime user of the first platform on an associated video display device. One or more practice platform is disposed on a support surface in harmony with the first platform such that a practicing user, while operating a practice platform, may also receive an input from the video display device, each practice platform being formed by elements arranged substantially to suggest portions of an operable activation surface of the first platform. A first user of the system is placed in operable association with the first platform to form a first prime user. A second user of the system is placed in operable association with a practice platform as a practice user. The control device then outputs a signal to the video display device for a proscribed first increment of time, during which first increment of time the first prime user and the practice user operate their respective platforms in accordance with instructions displayed on the video display device.

Subsequent to elapse of the first increment of time, the method includes causing a rotation in position between users of the system effective to form a new prime user. Selection of new prime user may be based upon competitive performance of certain users, or a proscribed rotation pattern. The method may be extended by using the control device to output a signal to the video display device for a second proscribed increment of time, during which second increment of time the new prime user and a practice user operate their respective platforms in accordance with instructions displayed on the video display device. The method may additionally be extended by repeating a rotation in position between users, and using the controller to output a signal on the video display for one or more subsequent increments of time.

These features, advantages, and alternative aspects of the present invention will be apparent to those skilled in the art from a consideration of the following detailed description taken in combination with the accompanying drawings.

BRIEF DESCRIPTION OF THE SEVERAL VIEWS OF THE DRAWINGS

In the drawings, which illustrate what are currently considered to be the best modes for carrying out the invention:

FIG. 1 is an exploded assembly view of a dance platform structured according to the invention;

FIG. 2 is the platform of FIG. 1, in partially assembled condition;

FIG. 3 is the platform of FIG. 2, in further stage of assembly;

FIG. 4 is an exploded detail view of structure assembled at the location denoted in FIG. 2 by arrows 4-4;

FIG. 5 is a cross-section taken through a portion of an assembled platform;

FIG. 7 is a top view of a portion of a platform;

FIG. 8 is a view in perspective of joining structure;

FIG. 9 is a top view of portions of two platforms in position to receive the joining structure illustrated in FIG. 8;

DETAILED DESCRIPTION

Figure 6:
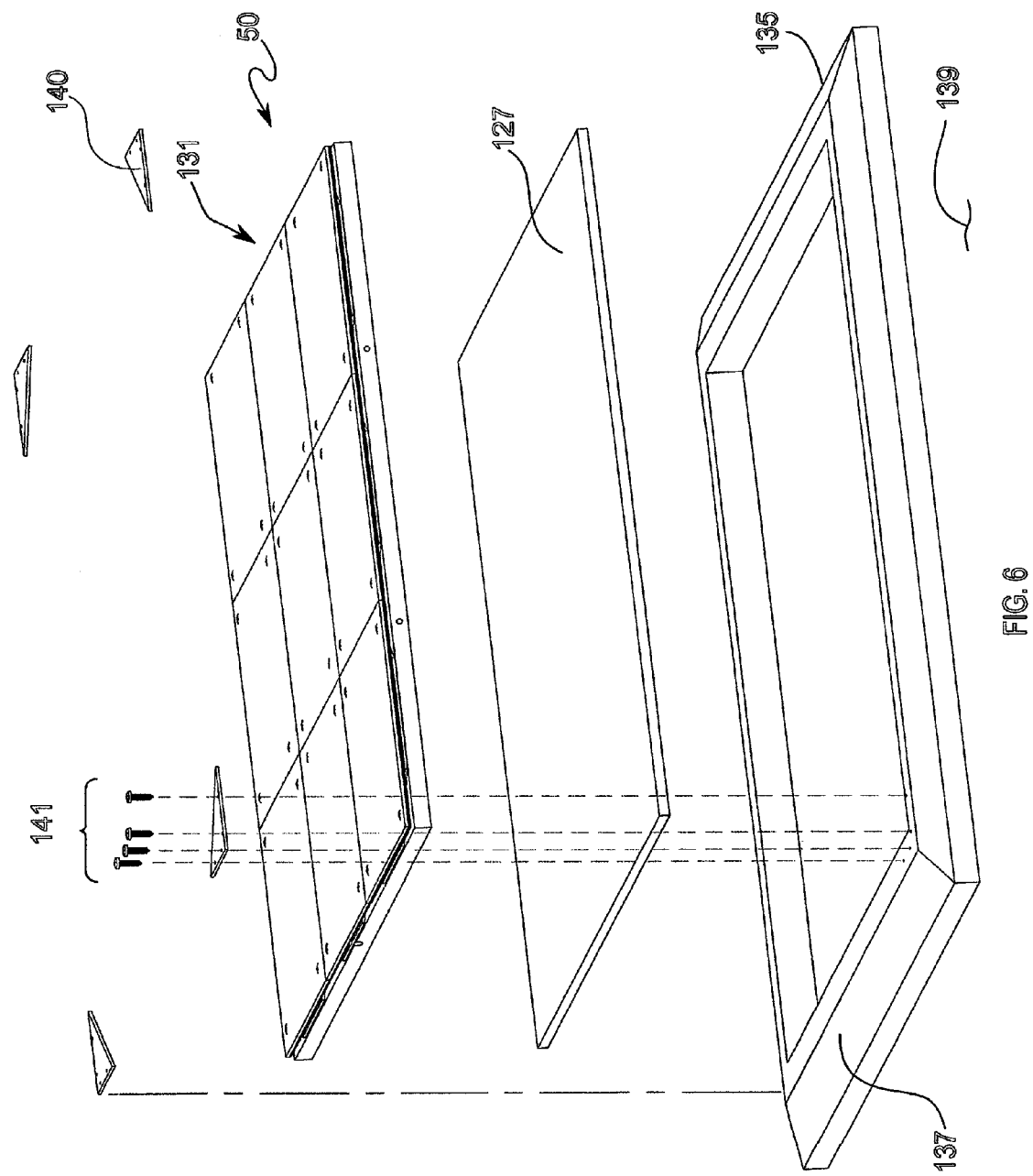
FIG. 6 is an exploded assembly view of an alternative platform arrangement.

Reference will now be made to the drawings in which the various elements of the illustrated embodiments will be given numerical designations and in which the invention will be discussed so as to enable one skilled in the art to make and use the invention. It is to be understood that the following description is only exemplary of the principles of the present invention, and should not be viewed as narrowing the claims which follow.

The invention can be embodied as a platform holding a plurality of normally-open electrical switches in position for closing a selected switch by applying a force, typically normal to a switch surface, with a portion of a human body. Such platforms may be used in a variety of applications, such as in various forms of physical therapy, and as dance platforms of the type used in certain competitive games and for exercise, including group exercise. Certain platforms used in a therapy application may be structured for disposition of the platform vertically, horizontally, or at an intermediate angle, for activation of a selected switch by a user's hands in accordance with a user input from an audio and/or a visual display device. A dance platform typically is disposed on a load bearing surface for activation of a selected switch by contact with a foot of a standing user.

An exemplary dance platform, generally indicated at 50, is illustrated in FIG. 1. Dance platform 50 includes a base 53 which typically provides a channel structure 55 operable to hold a wire harness 57. Illustrated wire harness 57 typically includes nine individual insulated wires connected at one end to a conventional 9-pin serial connector 59. Channel structure 55 typically is branched to provide a run operable to dispose terminal ends of certain wires of harness 57 at locations disposed over the base 53.

A base 53 can be made from a wide range of materials, with a nonconductive material being preferred. It is currently preferred to make a base 53 from a substantially square section of wood. Operable wood includes particle board, plywood, or solid wood. Plastic, rubber, urethane, and other materials capable of forming a load bearing surface, are also operable as a base 53. It is also desirable that a base 53 be structured to receive and hold threaded fasteners.

During assembly of a platform 50, an electrically conductive element 63 is disposed for support on top of a base 53 having an installed wire harness 57. A conductive element 63 serves as a common ground contact for a plurality of switches, as will be described in detail below. A plurality of perforations 67 generally are provided distributed about an electrically conductive surface 71 of conductor 63. End portions of wire conductors carried by harness 57 are placed in electrical isolation through certain such perforations 67.

An operable conductive element 63 may be fashioned from a section of sheet metal sized in general harmony with a size of base 53. For example, ground plate 63 may be made from mild steel sheet metal having any practical gage thickness. It is currently preferred to make ground plate 63 from galvanized sheet metal having a thickness of about 28 gage, and about 33 inches wide by about 33 inches tall, or so. It is within contemplation to make ground plate 63 from alternative structure, such as from expanded sheet metal, or even as an electrically conductive coating applied to a base 53. Both ferrous and nonferrous metals are workable to form a ground element 63. An operable ground member 63 can alternatively be made as a network of electrically connected patches disposed for association of one or more patches with a switching member.

Once the ground sheet 63 is placed on a base 53, corner buttons 75 can be installed to hold the sheet 63 in place on the base 53. With reference to FIG. 4, it is currently preferred to make a corner button 75 from adhesive-backed hook-and-loop fastener material. The adhesive backing of one portion 79 (either a hook-side or a loop-side) is placed at a plurality of strategic locations in overlapping contact with both the ground element 63 and base 53. The cooperating portion 83 is then applied to the first portion 79, exposing a second adhesive surface 87 to hold a corner 91 of a deflection member 95. Certain buttons 75 may also hold a terminal end 99 of a wire from harness 57 to place an exposed end of a wire's conductor for compression contact against corner 91 upon installation of a fastener 103. Typically, an end 99 is coiled to place an uninsulated portion 100 of a wire conductor over a portion of the wire 101 that forms a coil (as illustrated in FIGS. 4 and 5), to ensure electrical communication is made with a conductive area of a switching member, such as deflection member 95.

As illustrated, a deflection member 95 may be structured as an approximately square tile or plate, typically sized about 11 inches wide by about 11 inches tall in certain currently preferred dance platforms 50. The member 95 carries an electrically conductive area disposed to make switching contact with a cooperating portion of ground element 63. Desirably, a deflection member 95 is fashioned from a material having resilience to bending and a memory to bias or restore a deflected such member 95 toward an original position. It currently is preferred to form an illustrated deflection member 95 from a square section of sheet metal, such as galvanized mild steel, having a thickness of about 26 gage.

A plurality of fasteners 103 are disposed about a perimeter of a deflection member 95 operably to hold the deflection member 95 in functional position with respect to a base 53. As illustrated, one fastener 103 is placed at each of the four corners 91 of an illustrated deflection member 95. However, it is within contemplation for a single fastener 103 to be placed through a bracket structured to hold a plurality of corners. In such construction, a single fastener can secure one, two, or up to four corners, to speed assembly of a platform 50.

While fasteners 103 are illustrated as being threaded fasteners, other arrangements are operable, including rivets, nails, bolts, and nuts. It is preferred to use a fastening arrangement that can be removed, to permit servicing an assembled platform 50. Fasteners 103 desirably operate in harmony with fulcrum structure to cause a membrane-bias in a deflection member 95 operable to bow a center section of member 95 in a direction away from ground element 63. As illustrated, corner buttons 75 operate as fulcrum structure cooperating with fasteners 103. Perforations 67 also, or alternatively, may be sized and disposed to operate as fulcrum structure. In any case, the ground member 63 is structured in harmony with the deflection members 95, such that a conductive path between them is not established by installation of the fasteners 103.

A switch portion, generally indicated at 107 in FIG. 5, of a platform 50 includes ground member 63 and a deflection member 95. Such a switch is normally-open, and is structured to be closed by a user's weighted foot placement to deflect a conductive area of member 95 into contact with a cooperating portion of element 63.

In an alternative configuration to form a normally-closed switch, fulcrum structures are located at peripheral positions with respect to fasteners, effective to cause a membrane bias to deflect a center portion of a deflection member into contact with a ground element. Such a normally-closed switch may be actuated to an open position by a push or pull member that is disposed to separate an electrically conductive contact between the deflection member and ground element.

Commonly, indicia is placed over a switch 107 to indicate a foot placement position or zone (and generally, a corresponding underlying switch 107), to a user. As illustrated, a decal 111 may be used as such indicia. A decal 111 may illustrate a shape, and/or a color. Indicia may be painted, or applied as a film to member 95, or to a bottom surface of a tile 115. Such indicia could be applied to a top surface of a tile 115, but it is currently preferred to dispose a transparent barrier between the indicia and a stepped-on surface of the switch 107. In certain embodiments of a switch 107, a tile 115 can alternatively be incorporated into a deflection member 95.

A tile 115 is generally structured to permit a transverse deflection of a center membrane portion operable to deflect a corresponding membrane portion of deflection element 95 into contact with ground 63. A membrane bias in deflection member 95, caused by fasteners 103 and fulcrum structure, operates to restore the switch 107 to an open configuration subsequent to removal of a user's weight. It has been determined that a polycarbonate plastic material sold under the trade name LEXANE™ and having a thickness of about 0.1 inches, is one material operable to form a rugged and long lasting tile 115.

In certain embodiments of the invention, a protective membrane 119 may be included in a dance platform 50. When present, such a membrane 119 is arranged to resist passage of contaminant material, such as particulate or fluid matter, into a space 123 between ground plate 63 and deflection member 95. Plastic material, such as sold under the trade name LEXANE™ and having a thickness of about 0.1 inches, is an operable material to form a protective membrane 119.

In a preferred method of manufacturing a platform 50, a plurality of manufacturing-assist jigs are used to facilitate alignment of individual components of the platform. With reference again to FIG. 1, a preferred manufacturing method includes placing a base 53 in a vertically oriented position to receive a wiring harness 57 in channel structure 55. Ground plate 63 is then placed on top of the base 53 to expose terminal ends of individual wires at perforation locations 67. The ground member 63 desirably is sized such that its perimeter edge may be aligned with structure of the base 53.

A jigplate, having a size in accordance with the base 53, is used to place a first portion of a plurality of adhesive-backed hook-and-loop fasteners 75 at desired locations in correspondence with corners of later-installed tiles 115. A preferred such jigplate includes a plurality of second portions of hook-and-loop fasteners that are configured to cooperate with the first portions, and includes a reduced area of hook-and-loop contact. Currently preferred hook-and-loop fasteners are round buttons with adhesive backing on each portion—both the hook portion, and the loop portion. In any case, the shape of the fastener portions carried on the jigplate desirably corresponds with the shape of the portions to be installed, to facilitate placement of the to be installed portions onto the jigplate. The reduced area of hook-and-loop contact is sized large enough to hold the first portion in a desired position on the jigplate, but small enough to release the first portion from engagement with the second portion after the jigplate is placed into receiving position on top of the base 53. Then, the jigplate is removed, leaving behind a plurality of first portions in a plurality of desired installed positions effective to hold the ground element 63 with respect to the base 53.

The cooperating portions of resilient elements 75 are then placed into making reception onto the installed first portions, and their adhesive backing is exposed. The exposed adhesive backing facilitates placement of wire ends of the harness 57. Typically, the wire ends are coiled, as explained previously, and an exposed portion of bare wire is located to drape over a coil, thereby forming a contact location between that wire and a subsequently installed switch plate 95. It is currently preferred to use an alignment jig that holds a plurality of rail elements defining a tic-tac-toe grid operable to space apart the metal tiles 95 and decals 111. Such switch elements are simply dropped into receiving position between spacing elements of the alignment jig, and may be secured with fasteners disposed at corner locations. Cover plates 115 may also be placed at the same time, so long as no membrane 119 is installed in the particular platform 50 that is under construction. If a membrane 119 is to be included, the alignment jig is removed while the membrane is placed into position, then reinstalled to facilitate placement of the top tiles 115 in a properly spaced apart conformation.

With reference now to FIG. 6, a dance platform advantageously may be associated with shock-absorbing structure, such as resilient element 127, operable to deflect responsive to a foot strike on an activation surface of the platform 50, generally indicated at 131, effectively to reduce repetitive contact stress on a user. An operable resilient element 127 is formed from a foam pad, such as part No. 55240, sold by Furniture/Mattress Supply Co., having a place of business at 16 West Central Ave. South Main, Murray, Utah 84107. A resilient element 127 can be disposed anywhere in the load path from a user and between an activation surface 131 and a load supporting surface 139. The illustrated sheet of foam 127 sized for disposition under a platform 50 is only one operable shock absorbing solution.

A platform 50 may also, or alternatively, be associated with a tub 135 adapted to provide a load-bearing ramp edge 137 disposed about all or a portion of a perimeter of the platform 50. Desirably, the ramp edge 137 is configured to accommodate a difference in elevation between a top surface 131 and a platform support surface 139, thereby to resist twisting an ankle of a user who steps on that perimeter. A tub 135 desirably includes a friction enhancing interface to resist movement of a contained platform 50 with respect to support surface 139. In certain cases, one or more corner brackets 140 and bracket fasteners 141 may be employed to maintain a platform 50 in association with a tub 135.

At times, it is desirable to operate a pair of dance platforms 50 in a fixed side-by-side configuration. One such situation arises during operation of the respective dance platforms by two competing users. FIGS. 7-9 illustrate details of one operable coupling structure adapted to maintain a pair of platforms 50 in such a fixed side-by-side arrangement. The coupling structure includes retaining structure associated with a platform 50, such as one or more protruding bolt head 143. Such retaining structure 143 may be affixed directly to a platform 50, or to structure associated with a platform, such as a tub 135. An exemplary spacer 147 may be formed from a length of metal having a generally U-shaped cross-section, and a width indicated at D1. Slot structure, generally indicated at 151, is disposed in downwardly projecting arms 155 to cooperate with the retaining structure 143. As illustrated in FIG. 7, a space indicated at D2 is formed to accommodate structure forming an arm 155.

With reference to FIG. 9, a first platform, generally indicated at 159, is placed into a side-by-side arrangement with a second platform, generally indicated at 163, to define a space 167 having a width indicated at D3. The width D3 is sized in accordance with the width D1 to permit a user to place spacer 147 into area 167 such that an engagement is formed between slots 151 and retaining structures 143. Such a coupling arrangement permits a tool-free removal of the spacing structure 147. Alternative coupling structure within contemplation includes spacer structure permanently associated with a respective platform and structured removably to engage either with a second platform, or with structure associated with that second platform.

In general, a dance platform 50 is associated with a game controller 167 to provide instructions and feedback to a user in a competitive game or exercise format. Sometimes it is desirable to secure the controller 167 against loss by theft. One embodiment adapted to resist theft of a controller 167 includes a theft resistant vault 171 sized to contain a commercially available game controller 167, such as a Play Station II, or an X-box. Illustrated vault 171 is sized to contain game controller 167 at least substantially inside a space 175, and to provide one or more access ports 179 through which to place the controller 167 into electrical communication with a platform 50. A typical such electrical communication is accomplished with a serial cable 183. Additional access ports 179 may be adapted to permit passage of cable 187 for connection to a power source, and cable 191 for connection of controller 167 to a video display device.

Figure 10:
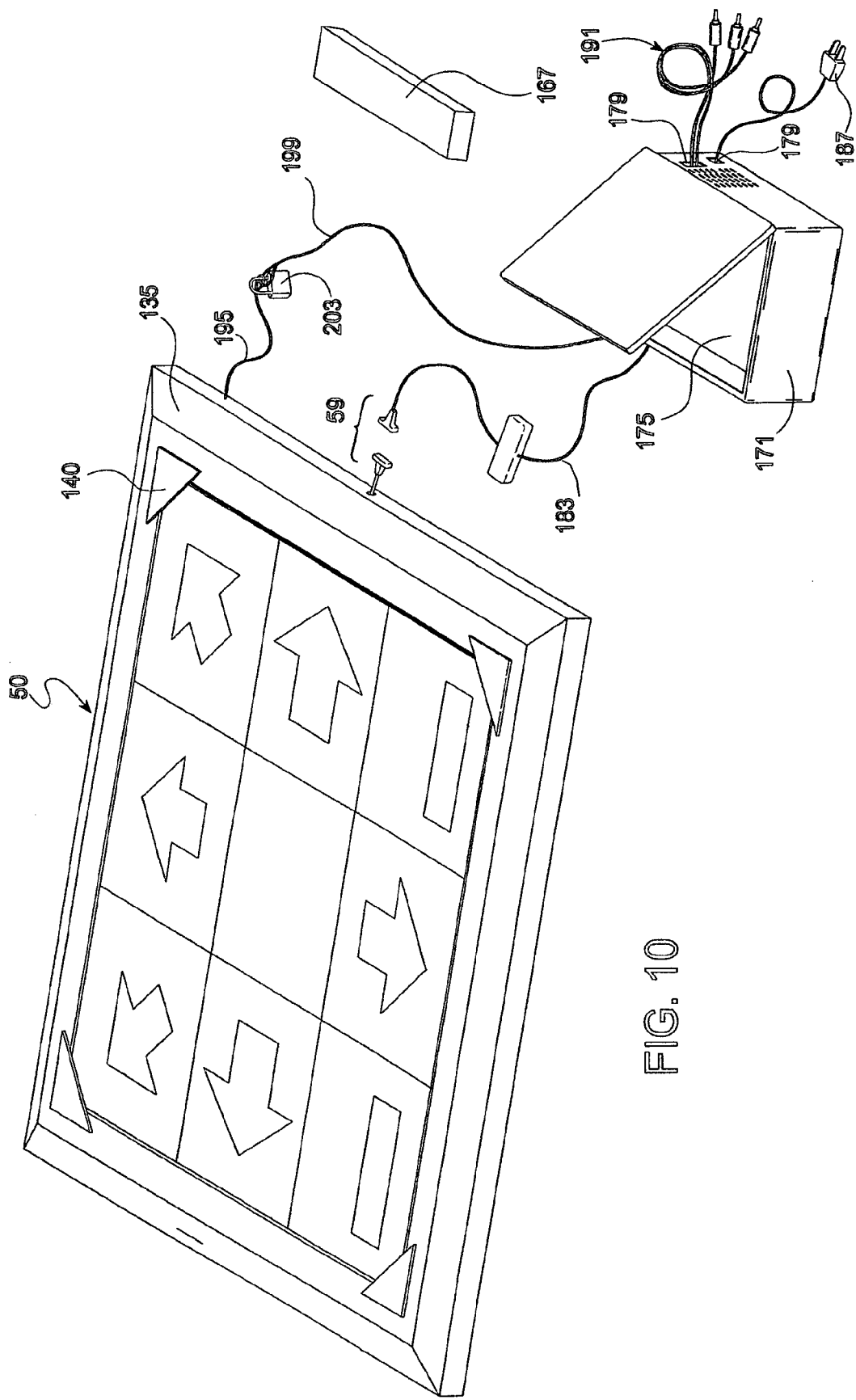
FIG. 10 is a view in perspective of a platform and an associated theft resistant vault.

It sometimes is preferred to secure the vault 171 in tethered engagement to structure associated with a platform 50 to provide a theft resistant combination. As illustrated in FIG. 10, a platform security cable 191 is connected to a vault security cable 199 by way of lock 203. One end of platform security cable 191 is affixed to structure associated with the platform 50, such as tub 135 or part of the platform 50 itself. An end of vault security cable is affixed to vault 171. An operable way to affix respective cables to a platform 50 or vault 171 is to place a loop formed in a cable end through an aperture, and then to fasten an object too large to pass through that aperture to the loop end. Operable obstruction objects include locks 203, and threaded chain quick-links. Of course other arrangements are operable to affix a security cable to a platform 50 or vault 171, including welding, or the use of permanent or one-way fasteners. Certain such fasteners include pop rivets, fasteners having heads that require specialized and uncommon tools, and fasteners having heads adapted to engage a fastener-driving tool only in a tightening direction.

Practice platforms can be used to advantage with active platforms 50 in certain circumstances. A practice platform generally is operated with the practice platform placed in electrical isolation from a game controller 167, but generally is disposed in proximity to a video display device that provides input to a user who is operating the practice platform. In most cases, a practice platform may be regarded as an inert device, in that no feedback for the practicing user is created. Practice platforms typically are low cost structures arranged to simulate the activation surface of a dance platform 50. A user, operating a practice platform, typically will observe the input from a video display device connected to an active platform 50, and can practice, or rehearse the movements dictated by that video display. A plurality of reduced cost practice platforms can be used in combination with one or more active platforms, to permit participation by a number of individuals in an organized competition, or exercise routine.

Figure 11:
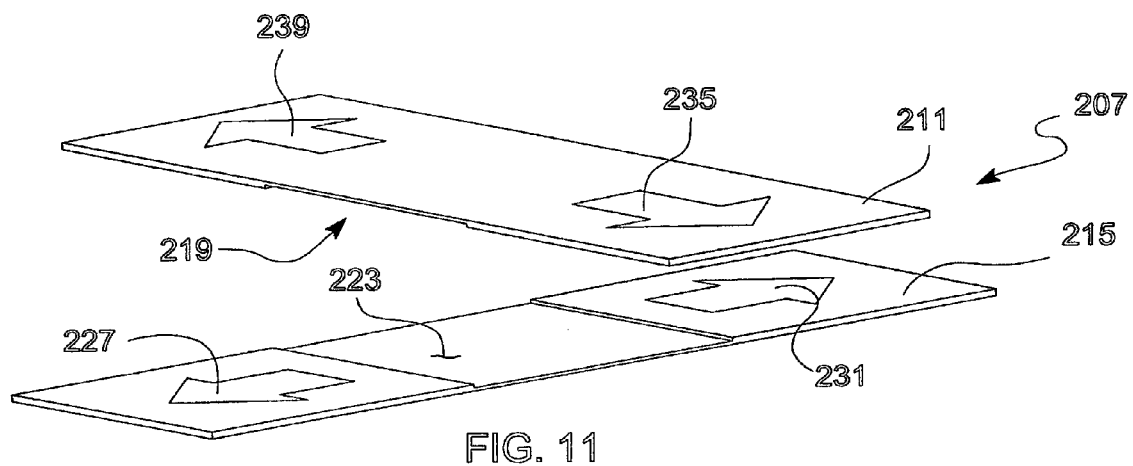
FIG. 11 is an exploded view in perspective of one embodiment of a practice platform.
Figure 12:
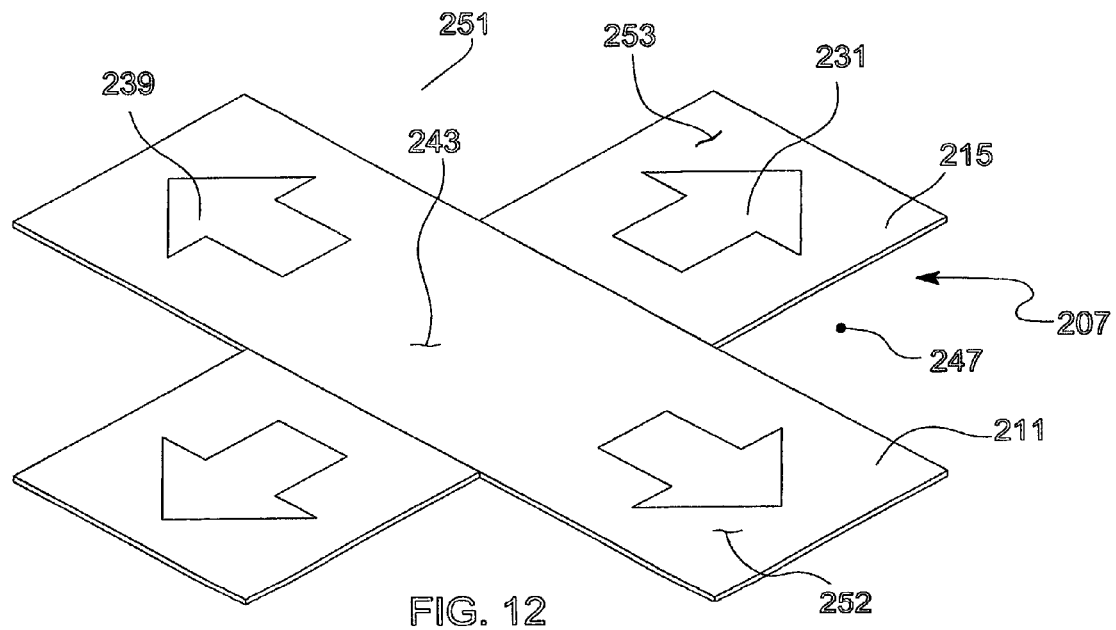
FIG. 12 is a view in perspective of the platform illustrated in FIG. 11, in assembled condition.

FIGS. 11 and 12 illustrate one currently preferred practice platform 207 adapted for partial disassembly to enhance portability and to provide for compact storage. Practice platform 207 includes a first walkway 211 and a second walkway 215. The first and second walkways carry cooperating interlock structure 219 and 223, respectively, configured to hold one walkway in a fixed position with respect to the other walkway. On assembly to form a cross-like arrangement, as illustrated in FIG. 12, practice platform 207 provides structure operable to suggest zones, or stations for foot placements, representing the activation surface of a dance platform 50. Walkway 215 carries emblem structure 227 and 231 to indicate a plurality of such zones. Walkway 211 carries emblem structure 235 and 239, similarly to indicate a plurality of zones. A zone 243 in common with walkway 211 and 215 is formed at the overlap area of the walkways. Additional zones, including 247 and 251, are suggested at empty corner areas of the cross-like platform 207. If desired, one or more discrete emblems suggesting corner structure of a platform 50 may also be placed in a corner zone 251, 247 of platform 207.

A walkway may be formed from any material having operable structural properties. For example, walkways 211 and 215 may be made from a plastic or from wood. Desirably, a thickness of the material forming a walkway is sufficiently thin so that a user is not at risk of twisting an ankle when stepping on an edge of the walkway's surface. A desirable thickness is about ¼ inch, or less. It is currently preferred for a walkway 211 to include black arrows 235, 239 on a blue background 252. Also, walkway 215 typically will include black arrows 227, 231 on a red background 253.

It is within contemplation to form a practice platform from structure having alternative arrangements than the illustrated structure. A practice platform must merely suggest the activation surface of an active platform, such as platform 50. A workable practice platform can even be formed by an active platform 50 that is not connected to a game controller to provide feedback to the practicing user.

A functional practice platform may be formed by placing discrete emblems in an arrangement on a load bearing surface to suggest an activation surface of a dance platform. An operational discrete emblem may be formed from a suitably thin material to suggest the shape of an arrow or simply a colored shape, and oriented on a load bearing surface to represent an emblem such as emblem 231, or 239, or at an angle to represent a corner zone 251. It is desirable for the discrete emblems to have an operable friction interface with the load bearing surface effective substantially to maintain a position of the emblems during operation of the practice platform.

An alternative practice platform can be formed as pictorial representations on a roll-up rectangular sheet of material, such as a plastic membrane or a cloth-like material. The surface of a practice platform can be rectangular, approximately square, cross-like, or any other shape, so long as a visual appearance effected by the practice platform suggests an activation surface of an active platform. Preferably, the practice platform includes designated spaces in correspondence with the four arrow locations of a commercial embodiment of a DDR dance platform. It also is within contemplation to form a practice platform in the approximate shape of an octagon. Such an octagon shape may be formed by trimming certain corners of a square at about a 45 degree angle, or by removing portions from one, two, three, or four corners of a theoretical starting square. The material removed in such theoretical transformation can include a radiussed portion, somewhat like a stylized shape of an ice cream cone.

Figure 13:
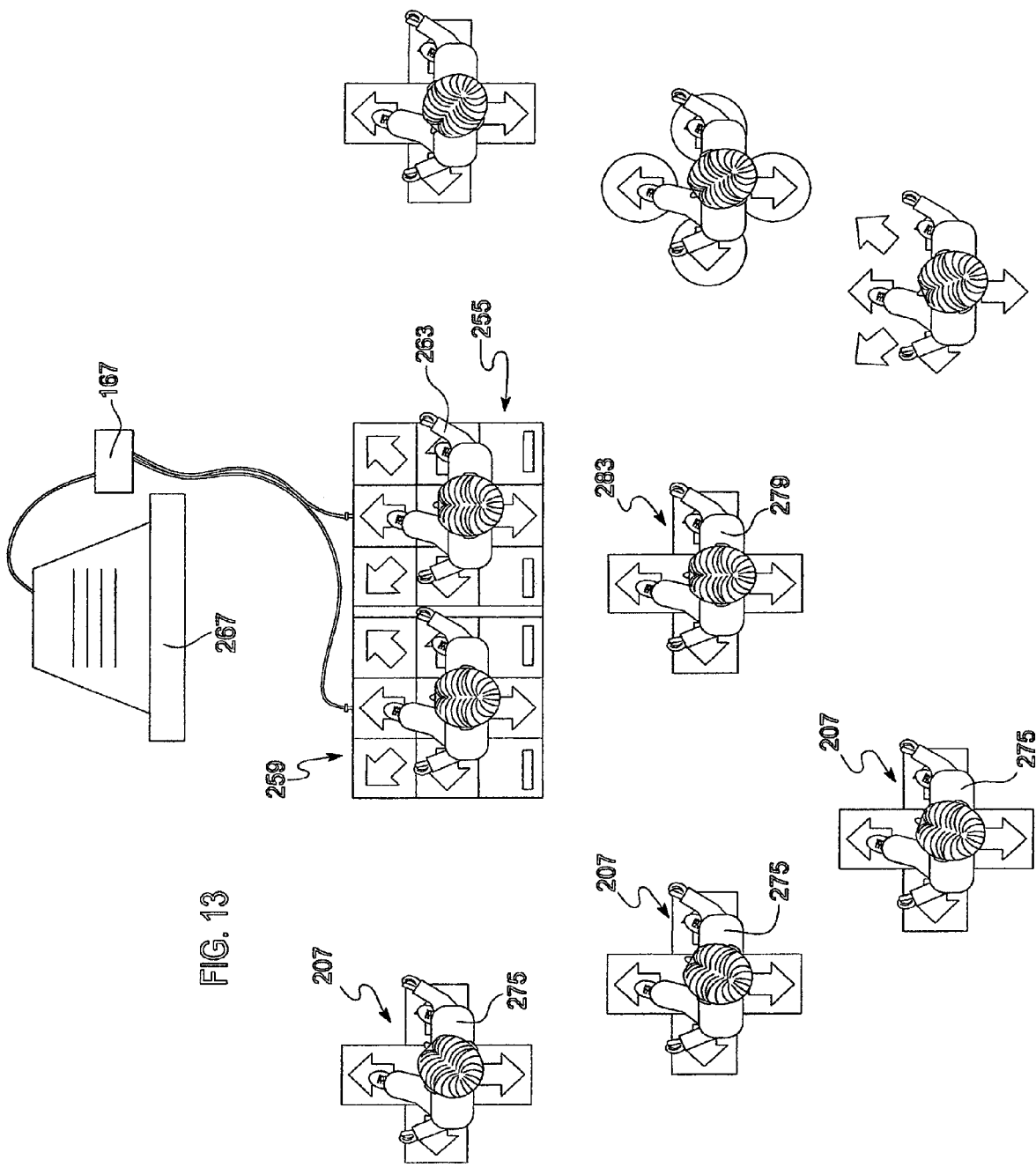
FIG. 13 is a top view of an exercise system including active and practice platforms.

FIG. 13 illustrates a pair of active platforms 255 and 259 connected to a controller 167 in an arrangement to permit competitive operation of the platforms. A first active user 263 is operating active platform 255 in accordance with instructions displayed on video display 267. A second active user 271 is operating active dance platform 259. In certain instances, an active user may be regarded as a prime user. A plurality of practice users 275 are illustrated operating a plurality of inert, or passive practice platforms 207 disposed to permit the practice users 275 to observe the display device 267. In certain cases, controller 167 can be adapted to output two sets of instructions on a display screen 267 at the same time, and to score a user in accordance with each output. In such cases, one instruction set may be at a more advanced level than the other, to permit participation of users having a plurality of ability levels.

One way to operate the system illustrated in FIG. 13 is as follows: A first user is placed into operable association with the first platform 255 to form a first prime user 263. A second user 279 is placed into operable association with a practice platform 283 as a practice user. A controller 167 is used to output a signal to video display device 267 for a proscribed first increment of time, such as for the duration of a song. During that first increment of time, the first prime user 263, the practice user 279 (and other users 271, 279 if present), operate their respective platforms in accordance with instructions displayed on video display device 267. Subsequent to elapse of the first increment of time, a rotation in position between users of the system typically occurs effective to form a new prime user and the prime user 263 may be rotated to a practice position. The controller 167 may then display instructions on device 267 corresponding to the same or a new song, or instruction set. When two prime users 263, 271 are present, the prime user who "wins" (best matches the foot placements in correspondence to the placements proscribed by controller 167), may remain as a prime user, and the "losing" prime user may rotate to a practice user position. In an alternative method of use, both prime users 263, 271 may rotate to be replaced by a pair of practice users 271 or 279 subsequent to having their "turn" as prime users.

While the invention has been described in particular with reference to certain illustrated embodiments, such is not intended to limit the scope of the invention. The present invention may be embodied in other specific forms without departing from its spirit or essential characteristics. The described embodiments are generally to be considered only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a platform of the type having a substantially planar top surface defining an area bounded by a perimeter, with the top surface being spaced apart by a first distance from a support surface on which the platform may be disposed, the platform including a plurality of switches disposed on the top surface for actuation of the switches by a stepping action of a user's foot, the improvement comprising:
   a removable ramp disposable about a portion of said perimeter, a cross-section of said removable ramp comprising a wedge structured to form a load-bearing transition between said top surface and said support surface, and a thickness of one edge of said wedge being sized approximately in harmony with said first distance.

2. The improvement according to claim 1, wherein:
   said removable ramp comprises edge structure of a removable tub that is adapted to receive a bottom of said platform, said edge structure being configured to provide a load-bearing ramp disposed about said portion of said perimeter of said platform to accommodate a difference in elevation between said top surface and said support surface, thereby to resist twisting an ankle of a user who steps on said portion of said perimeter.

3. The improvement according to claim 2, further comprising:
   a resilient element disposed in a load bearing path between said top surface and said support surface, said resilient element being operable to deflect responsive to a foot strike on said top surface effectively to reduce repetitive contact stress on a user.

4. The improvement according to claim 3, wherein:
   said resilient element is associated with said tub.

5. The improvement according to claim 4, wherein:
   said tub is composed of a material effective to reduce repetitive contact stress on a user.

6. The improvement according to claim 2, wherein:
   said removable tub is adapted to receive said platform in tool-free, drop-in assembly.

7. The improvement according to claim 2, wherein:
   said removable tub is structured and arranged to form a socket in which to receive said bottom surface of said platform.

8. The improvement according to claim 7, further comprising:
   a resilient element adapted for disposition between a portion of said bottom surface of said platform and said support surface, said resilient element being operable to deflect responsive to a foot strike on said top surface effectively to reduce repetitive contact stress on a user.

9. The improvement according to claim 8, wherein:
   said resilient element is removable from said tub.

10. The improvement according to claim 1, wherein:
    said removable ramp is structured to be removable from association with said platform in a tool-free operation.

11. The improvement according to claim 1, wherein:
    said removable ramp has a substantially tapered cross-section between a thick part and a thin part, with said thick part being structured for disposition in proximity to an edge of said platform, and said thin part being structured for disposition spaced apart from said edge.

12. The improvement according to claim 1, wherein:
    said plurality of switches are disposed among only nine desired foot-placement locations arranged in three rows and three columns.

13. In a platform of the type having a substantially planar top surface defining an area bounded by a perimeter, with the top surface being spaced apart from the platform's bottom surface by a first distance, the platform including a plurality of switches disposed on its top surface for actuation of the switches by a stepping action of a user's foot, the improvement comprising:
    a removable tub adapted to receive said platform in drop-in assembly, a portion of said removable tub providing ramp structure comprising a cross-section configured as a wedge and arranged for disposition about a portion of said perimeter, an edge of said wedge having a thickness sized in approximate agreement with said first distance, said ramp structure being arranged to form a load-bearing transition between said top surface and a support surface effective to reduce twisting an ankle of a said user who steps on said portion of said perimeter.

14. The improvement according to claim 13, wherein:
    said removable tub is structured and arranged to form a socket in which to receive said bottom surface of said platform.

15. The improvement according to claim 14, further comprising:
    a resilient element adapted for disposition between a portion of said bottom surface of said platform and said support surface, said resilient element being operable to deflect responsive to a foot strike on said top surface effectively to reduce repetitive contact stress on a user.

16. The improvement according to claim 15, wherein:
    said resilient element is removable from said tub.

17. The improvement according to claim 14, said tub further comprising:
    a friction enhancing interface arranged for contact with said support surface, said friction enhancing interface being adapted to resist movement of a platform, which is installed in said tub, with respect to said support surface.

18. In a platform of the type used in machine dance activity and having a substantially planar top surface defining an area bounded by a perimeter, with the top surface being spaced apart from the platform's bottom surface by a first distance, the platform including a plurality of switches arranged in at least three rows and at least three columns on its top surface for actuation of the switches by a stepping action of a user's foot, the improvement comprising:

a removable ramp comprising a cross-section structured as a wedge having a maximum thickness sized in agreement with said first distance and arranged to be disposed about a portion of said perimeter, said removable ramp being arranged to form a load-bearing transition between said top surface and a support surface effective to reduce twisting an ankle of a said user who steps on said portion of said perimeter.

19. The improvement according to claim 18, wherein:
said plurality of switches are disposed among only nine desired foot-placement locations arranged in three rows and three columns.

20. The improvement according to claim 18, wherein:
said removable ramp has a substantially tapered cross-section between a tall part and a short part, with said tall part being structured for disposition in proximity to an edge of said platform, and said short part being structured for disposition spaced apart from said edge.

* * * * *